(12) United States Patent
Sugahara et al.

(10) Patent No.: US 9,136,767 B2
(45) Date of Patent: Sep. 15, 2015

(54) SWITCHING POWER-SUPPLY DEVICE

(71) Applicant: Sanken Electric Co., LTD., Niiza-shi, Saitama (JP)

(72) Inventors: Takeki Sugahara, Niiza (JP); Tetsuya Tabata, Niiza (JP); Takashi Matsumoto, Niiza (JP); Masao Ueno, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 28 days.

(21) Appl. No.: 14/037,583

(22) Filed: Sep. 26, 2013

(65) Prior Publication Data
US 2014/0119065 A1    May 1, 2014

(30) Foreign Application Priority Data
Oct. 31, 2012   (JP) ................. 2012-240299

(51) Int. Cl.
H02M 3/335   (2006.01)
H02M 1/00   (2007.01)

(52) U.S. Cl.
CPC .. H02M 3/33523 (2013.01); H02M 2001/0019 (2013.01)

(58) Field of Classification Search
CPC ............................... H02M 3/33515
USPC ............................. 363/21.13, 21.17
See application file for complete search history.

(56) References Cited

U.S. PATENT DOCUMENTS

| 8,125,799 | B2 | 2/2012 | Zhu et al. | |
| 2009/0097284 | A1* | 4/2009 | Takei et al. | 363/56.1 |
| 2009/0201705 | A1* | 8/2009 | Murata et al. | 363/53 |
| 2012/0134182 | A1 | 5/2012 | Zhu et al. | |
| 2013/0088898 | A1* | 4/2013 | Gao et al. | 363/21.16 |

* cited by examiner

Primary Examiner — Emily P Pham
(74) Attorney, Agent, or Firm — Banner & Witcoff, Ltd.

(57) ABSTRACT

A switching power-supply device comprises: a transformer; a switching element connected in series with a primary coil; an output voltage generation circuit to generate an output voltage from a voltage generated in a secondary coil; a control circuit power-supply-voltage generation circuit to generate a power-supply voltage from a voltage generated in an auxiliary coil; a feedback control circuit to control an ON width of the switching element by using the voltage generated in the auxiliary coil; a voltage reduction detection circuit to output a pulse signal to the secondary coil when a reduction of the output voltage is detected; a voltage-reduction-signal detection circuit to detect the voltage reduction signal transmitted to the primary coil from the secondary coil; and a trigger circuit to output a trigger signal to turn on the switching element when the voltage reduction signal is detected by the voltage-reduction-signal detection circuit.

6 Claims, 9 Drawing Sheets

SWITCHING POWER-SUPPLY DEVICE

CROSS-REFERENCE TO RELATED APPLICATION

This application claims priority from Japanese Patent Application No. 2012-240299 filed on Oct. 31, 2012, the entire subject matter of which is incorporated herein by reference.

TECHNICAL FIELD

This disclosure relates to a switching power-supply device of controlling an output voltage by a switching operation. Specifically, this disclosure relates to a switching power-supply device of a primary detection (PSR; Primary-Side Regulated) type in which an output voltage is indirectly controlled by a voltage of a primary-side auxiliary coil.

BACKGROUND

In the switching power-supply device of the primary detection type, it is impossible to detect the output voltage by the voltage of the primary-side auxiliary coil when a switching operation is not performed. This means that it is possible to detect the variation of the output voltage only at timing when a switching operation is intermittently performed, in an intermittent oscillation mode for the purpose of low-standby power at no load or light load state. Accordingly, it is impossible to rapidly respond to sudden load change from no load or light load state during the off period of the switching operation. This is a major drawback as a power-supply.

For this reason, a background switching power-supply device disclose a circuit, which detects the reduction of the output voltage due to the sudden load change from no load or light load state and outputs a voltage reduction signal informing the reduction of the output voltage to a secondary coil, and then a switching operation is started on the basis of the voltage reduction signal transmitted to an auxiliary coil from the secondary coil (for example, U.S. Pat. No. 8,125,799 B2 and US 20120134182 A1).

SUMMARY

However, the number of turns of the general auxiliary coil is less than that of the secondary coil and the voltage reduction signal applied to the secondary coil as a voltage signal is transmitted to the auxiliary coil while being greatly attenuated. Accordingly, it is difficult to detect the voltage reduction signal on the primary side, and thus the voltage reduction signal outputted by sudden load change would not be detected on the primary side, so that there is a problem that a rapid response to the sudden load change is not, to be performed.

In view of the above, this disclosure provide at least a switching power-supply device, in which a voltage reduction signal outputted by sudden load change can be simply detected on a primary side and a rapid response to the sudden load change can be securely performed.

The switching power-supply device of this disclosure comprises: a transformer including a primary coil, a secondary coil and an auxiliary coil; a switching element connected in series with the primary coil, an oscillation circuit to output a signal to turn on the switching element; an output voltage generation circuit to generate an output voltage from a voltage generated in the secondary coil; a control circuit power-supply-voltage generation circuit to generate a power-supply voltage for a control circuit from a voltage generated in the auxiliary coil; a feedback control circuit to control an ON width of the switching element by using, as a feedback signal, the voltage generated in the auxiliary coil according to an on-and-off operation of the switching element; a voltage reduction detection circuit to output a pulse signal as a voltage reduction signal to the secondary coil when a reduction of the output voltage is detected; a voltage-reduction-signal detection circuit to detect the voltage reduction signal transmitted to the primary coil from the secondary coil; and a trigger circuit to output a trigger signal to turn on the switching element when the voltage reduction signal is detected by the voltage-reduction-signal detection circuit.

In the above-described switching power-supply device, the voltage-reduction-signal detection circuit may be AC-coupled to a connection point between the primary coil and the switching element.

In the above-described switching power-supply device, the oscillation circuit, the feedback control circuit and the trigger circuit may be incorporated into the control circuit controlling a switching operation of the switching element, and the voltage reduction signal detected by the voltage-reduction-signal detection circuit may be inputted to the trigger circuit via an input terminal of the control circuit power-supply-voltage.

The above-described switching power-supply device may comprise a snubber circuit connected between the primary coil, a connection point between the coil and the switching element and the voltage-reduction-signal detection circuit may be AC-coupled with using capacitor of the snubber circuit.

In the above-described switching power-supply device, the switching element, the oscillation circuit, the feedback control circuit, voltage-reduction-signal detection circuit and the trigger circuit may be incorporated into the control circuit controlling a switching operation of the switching element, and a connection point between the primary coil and a drain of the switching element and the voltage-reduction-signal detection circuit may be AC-coupled.

According to this disclosure, there are advantages that a voltage reduction signal outputted by sudden load change can be simply detected as a voltage variation of a primary coil and a rapid response to the sudden load change can be securely made.

DETAILED DESCRIPTION

First Embodiment

Figure 1:
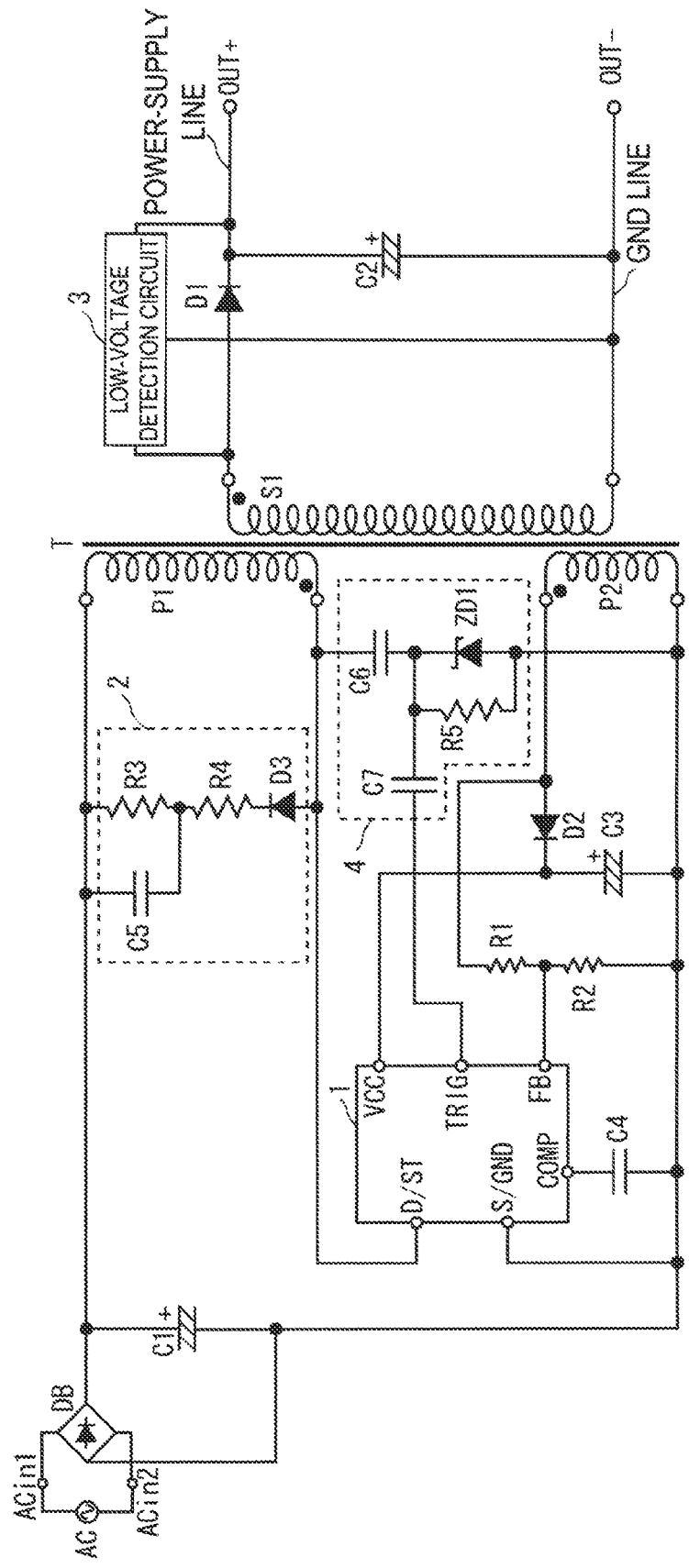
FIG. 1 is a circuit configuration diagram illustrating a circuit configuration of a switching power-supply device according to a first embodiment of this disclosure.

As shown in FIG. 1, a switching power-supply device of a first embodiment includes a rectifier circuit DB, electrolytic capacitors C1, C2, C3, a transformer T, rectifier diodes D1, D2, resistors R1, R2, a capacitor C4, a control circuit 1 having switching elements incorporated therein, a snubber circuit 2, a voltage reduction detection circuit 3 and a pulse detection circuit 4.

An alternating current (AC) power-source AC is connected to AC input terminals ACin1, ACin2 of the rectifier circuit DB that is configured by a diode bridge. AC voltage inputted from the AC power-source AC is full-wave rectified and outputted from the rectifier circuit DB. The electrolytic capacitor C1 is connected between rectified output positive electrode terminal and a rectified output negative electrode terminal of the rectifier circuit DB. In this way, the AC power-source AC is rectified-and-smoothed by the rectifier circuit DB and the electrolytic capacitor C1 and therefore a DC power-supply is obtained.

The transformer T includes a primary coil P1, a secondary coil S1 and an auxiliary coil P2. The polarity of the primary coil P1 is set to be opposite to the polarities of the secondary coil S1 and the auxiliary coil P2. The primary coil P1 of the transformer T is connected between a positive electrode terminal of the electrolytic capacitor C1 and a drain (D/ST) terminal of the control circuit 1 (switching element). Thereby, the rectified-and-smoothed DC power-supply is applied, as an input voltage, to the primary coil P1 of the transformer T. Further, a source (S/GND) terminal of the control circuit 1 (switching element) is connected to a negative electrode terminal of the electrolytic capacitor C1.

Figure 2:
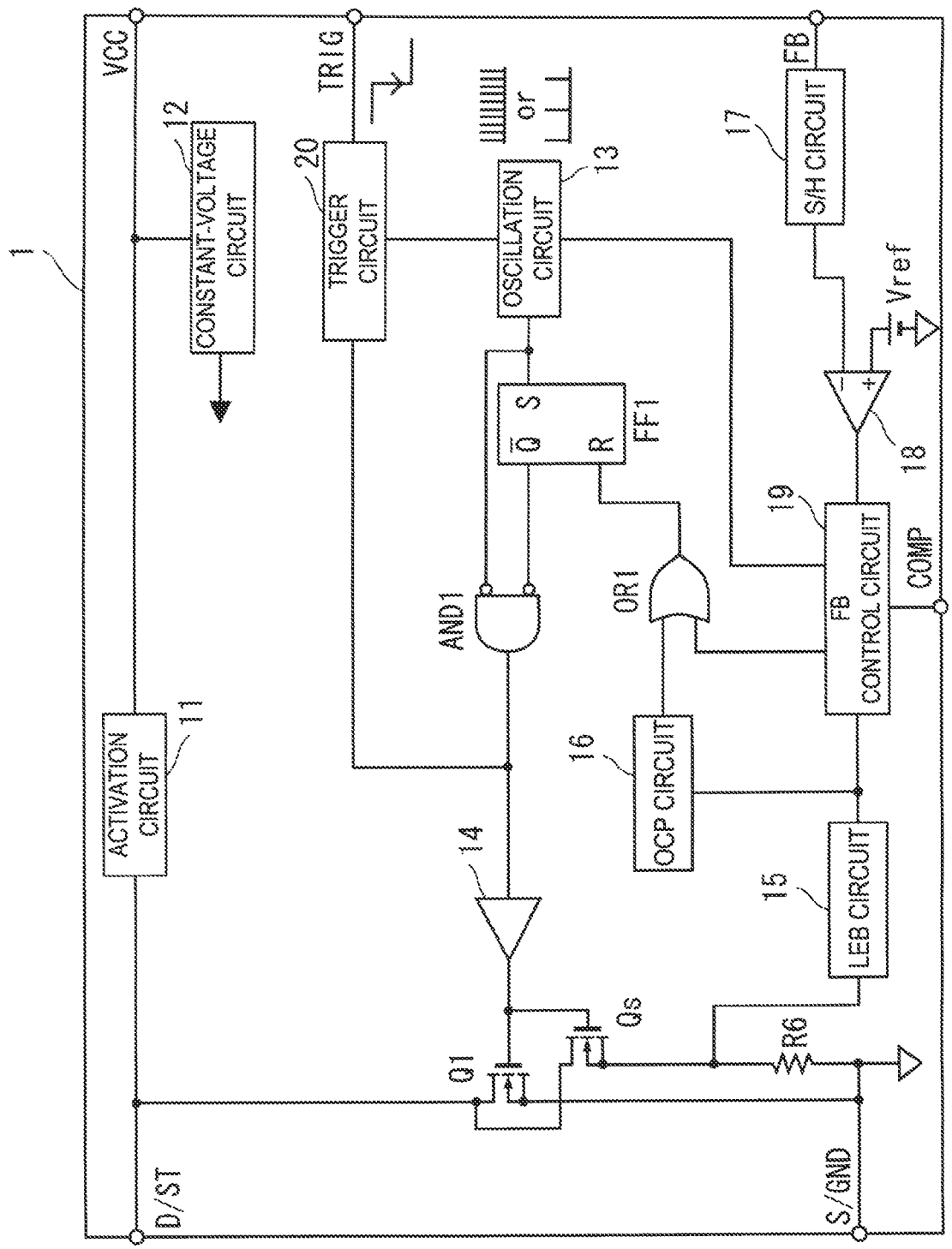
FIG. 2 is a circuit configuration diagram illustrating a circuit configuration diagram of a control circuit shown in FIG. 1.

The control circuit 1 is a circuit for performing a switching control to oscillate (to turn on-and-off) a built-in switching element Q1. As shown in FIG. 2, the switching element Q1 is connected between the D/ST terminal and the S/GND terminal. The switching element Q1 is configured by an N-type power MOSFET (Metal Oxide Semiconductor Field Effect Transistor). A drain of the switching element Q1 is connected to the primary coil P1 of the transformer T via the D/ST terminal of the control circuit 1 and a source of the switching element Q1 is connected to the negative electrode terminal of the electrolytic capacitor C1 via the S/GND terminal of the control circuit 1. As a result, the DC power-supply (input voltage) obtained by rectifying and smoothing the AC power-source AC by the rectifier circuit DB and the electrolytic capacitor C1 is outputted to the secondary coil S1 of the transformer T during the off-time by the on-and-off operation of the switching element Q1 connected thereto via the primary coil P1 of the transformer T. The electrolytic capacitor C2 is connected between both terminals of the secondary coil S1 of the transformer T via the rectifier diode D1. The AC voltage induced in the secondary coil S1 of the transformer T is rectified-and-smoothed by a secondary rectifying and smoothing circuit that is composed of the rectifier diode D1 and the electrolytic capacitor C2. The rectified-and-smoothed AC voltage is supplied, as a DC output voltage Vout, to a load (not shown) connected between a positive electrode output terminal OUT+ and a ground output terminal OUT−. In other words, the rectifier diode D1 and the electrolytic capacitor C2 serve as an output voltage generation circuit to generate an output voltage Vout from the voltage generated in the secondary coil S1. Here, a line connected to the positive electrode output terminal OUT+ is a power-supply line, and a line connected to the ground output terminal OUT− is a GND line.

The electrolytic capacitor C3 is connected between both terminals of the auxiliary coil P2 of the transformer T via the rectifier diode D2. A connection point between the rectifier diode D2 and the electrolytic capacitor C3 is connected to a power-supply-voltage input (VCC) terminal for control circuit the of the control circuit 1. In this way, the voltage generated in the auxiliary coil P2 is rectified-and-smoothed by the rectifier diode D2 and the electrolytic capacitor C3. Then, the rectified-and-smoothed voltage is supplied to the VCC terminal of the control circuit 1 and used as a control circuit power-supply-voltage for driving the control circuit 1. In other words, the rectifier diode D2 and the electrolytic capacitor C3 serve as a power-supply-voltage generation circuit for the control circuit to generate a power-supply-voltage for control circuit from the voltage generated in the auxiliary coil P2.

Further, the resistor R1 and the resistor R2 are connected in series between both terminals of the auxiliary coil P2 of the transformer T. A connection point between the resistor R1 and the resistor R2 is connected to a feedback (FB) terminal of the control circuit 1. Thereby, the voltage signal obtained by dividing the AC voltage generated in the auxiliary coil P2 by the resistor R1 and the resistor R2 is inputted, as a secondary voltage detection signal VFB, to the FB terminal of the control circuit 1. Here, the auxiliary coil P2 and the secondary coil S1 have the same polarity and the AC voltage generated in the auxiliary coil P2 is proportional to the AC voltage generated in the secondary coil S1. Accordingly, the secondary voltage detection signal VEB inputted to the FB terminal of the control circuit 1 is proportional to the AC voltage generated in the secondary coil S1.

The snubber circuit 2 is a protection circuit that is connected between the primary coil P of the transformer T and absorbs a transient high voltage occurring when the switching element Q1 is cut-off. The snubber circuit 2 includes resistors R3, R4, a diode D3 and a capacitor C5. Between the primary coil P1 of the transformer T, the resistors R3, R4 and the diode D3 are connected in series and the capacitor C5 are connected in parallel with the resistor R3. The diode D3 is connected in a direction in which the diode is forward biased by the voltage occurring in the primary coil P1 of the transformer T when the switching element Q1 is turned off.

The voltage reduction detection circuit 3 outputs a voltage reduction signal Ve when the output voltage Vout is equal to or less than a preset threshold voltage VTH. The voltage reduction signal Ve is a single-shot pulse voltage signal that is applied to the secondary coil S1 of the transformer T and transmitted to the primary side of the transformer T. For example, the voltage reduction detection circuit 3 can be configured by a comparator that compares the output voltage Vout with the threshold voltage VTH for voltage reduction detection and a switching element that is connected in a line shape for short-circuiting the diode D1 and turned on-and-off according to the output of the comparator. Although the single-shot pulse voltage signal is outputted as the voltage reduction signal Ve in the present embodiment, the multi-shot pulse signal may be outputted as the voltage reduction signal Ve in consideration of the effects of noise, etc., or the output timing, etc.

The pulse detection circuit 4 is a voltage-reduction-signal detection circuit for detecting the voltage reduction signal Ve transmitted to the primary coil P1 of the transformer T and includes a resistor R5, capacitors C6, C7 and a zener diode ZD1. One end of the capacitor C6 is connected to a connection point between the primary coil P1 of the transformer T and the D/ST terminal of the control circuit 1, and the other end of the capacitor C6 is connected to a cathode of the zener diode ZD1. A connection point between the auxiliary coil P2 of the transformer T and the S/GND terminal of the control circuit 1 is connected to an anode of the zener diode ZD1. Further, the resistor R5 is connected in parallel with the zener diode ZD1 and a connection point between the capacitor C6 and the cathode of the zener diode ZD1 is connected to a trigger (TRIG) terminal of the control circuit 1 via the capacitor C7. In this way, the pulse detection circuit 4 configures AC-coupled where the connection point between the primary coil P1 of the transformer T and the D/ST terminal of the control circuit 1 is connected to the TRIG terminal of the control circuit 1. The pulse detection circuit 4 detects the falling of the voltage reduction signal Ve transmitted to the primary coil P1 of the transformer T and inputs the detected falling signal to the TRIG terminal of the control circuit 1.

The control circuit 1 is a circuit for generating a drive signal that is applied to a gate terminal of the switching element Q1 by using a voltage (voltage of the electrolytic capacitor C3) of the VCC terminal as a power-supply-voltage to control a switching operation of the switching element Q1. As shown in FIG. 2, the control circuit 1 includes the switching element Q1, a activation circuit 11, a constant-voltage circuit 12, an oscillation circuit 13, a Flip-Flop FF1, an AND-circuit AND1, a drive circuit 14, a sensing switch element Qs, a resistor R6, a leading edge blanking (LEB) circuit 15, an over-current protection (OCP) circuit 16, an OR circuit OR1, a sample hold (S/H) circuit 17, an error amplifier 18, a reference voltage Vref, a feedback (FB) control circuit 19 and a trigger circuit 20.

The activation circuit 11 is connected between the D/ST terminal connected to the positive electrode terminal of the electrolytic capacitor C1 and the VCC terminal connected to the positive electrode terminal of the electrolytic capacitor C3. The activation circuit 11 is a constant-current circuit, which is operated at activation before staring of the switching control and supplies a constant-current to the electrolytic capacitor C3 connected to the VCC terminal. Further, the constant-voltage circuit 12 respectively converts the voltage of the electrolytic capacitor C3 into a power-supply-voltage for operating each part of the control circuit 1 and supplies the converted power-supply-voltage.

Figure 3:
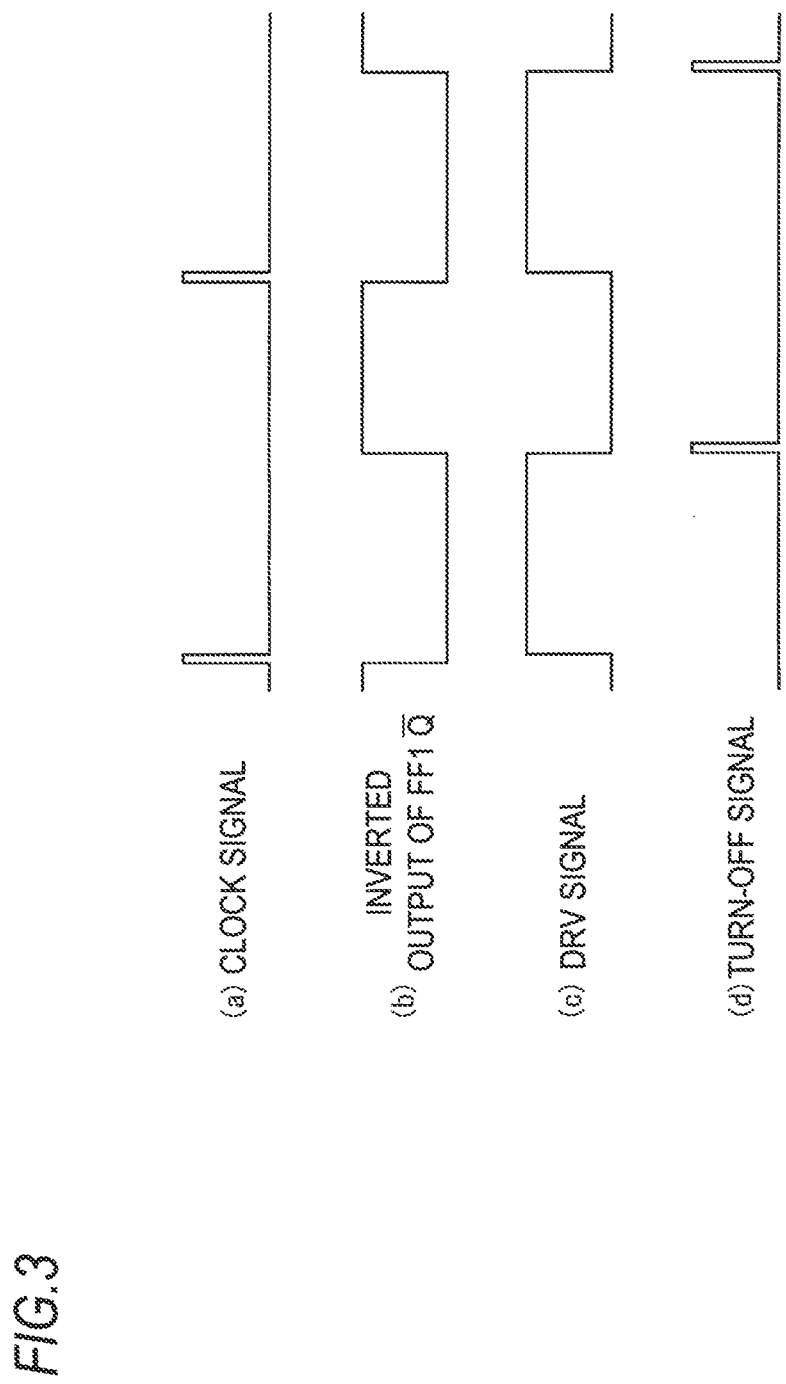
FIG. 3 is a waveform diagram illustrating signal waveforms and an operation waveform of each part in FIG. 2.

As show in a time chart (a) of FIG. 3, the oscillation circuit 13 oscillates, at a constant period, a clock signal for turning on the switching element Q1. The oscillation circuit 13 is set to either a normal oscillation mode or an intermittent oscillation mode having a period longer than the normal oscillation mode. The normal oscillation mode and the intermittent oscillation mode are switched by a mode switching signal from the FB control circuit 19.

The clock signal outputted from the oscillation circuit 13 is inputted to a set terminal S of the Flip-Flop FF1 and also inputted to one inverted input terminal of the AND-circuit AND1. Further, the inverted output $\overline{Q}$ of the Flip-Flop FF1 shown in time chart (b) of FIG. 3 is inputted to the other inverted input terminal of the AND-circuit AND1. The output of the AND-circuit AND1 is inputted to the drive circuit 14 for outputting a drive (DIM signal to drive the switching element Q1. In this way, the switching element Q1 is turned on by the falling of the clock signal, as shown in time chart (c) of FIG. 3.

The sensing switch element Qs and the resistor R6 configure a current detection circuit for detecting a drain current flowing through the switching element Q1. A drain of the sensing switch element Qs is connected to the D/ST terminal of the control circuit 1 and a source of the sensing switch element Qs is connected to the S/GND terminal of the control circuit 1 via the resistor R6. The sensing switch element Qs is turned on-and-off in synchronization with the switching element Q1. The voltage signal generated at a connection point between the source of the sensing switch element Qs and the resistor R6 is inputted to the LEB circuit 15 as a drain current detection signal.

The LEB circuit 15 is a circuit for invalidating (blanking) the generation period of the surge voltage when the sensing switch element Qs is turned on, within the period of the drain current detection signal. The drain current detection signal is respectively inputted to the OCP circuit 16 and the FB control circuit 19 via the LEB circuit 15.

The OCP circuit 16 compares the drain current detection signal with an over-current detection threshold voltage Vocp and outputs the over-current detection signal when the drain current detection signal, i.e., the voltage drop of the resistor R6 with respect to the S/GND terminal voltage reaches the over-current detection threshold voltage Vocp. The over-current detection signal is inputted to a reset terminal of the Flip-Flop FF1 via the OR circuit OR1. Then, as shown in time chard (d) of FIG. 3, the turn off signal is outputted, and then the switching element Q1 is turned off.

The S/H circuit 17 detects the falling of the secondary voltage detection signal VFB inputted to the FB terminal and holds the voltage immediately before the falling. The voltage held by the sample hold (S/H) circuit 17 becomes a feedback signal according to the output voltage Vout and is inputted to an inverted input terminal of the error amplifier 18. Here, the feedback signal held by the S/H circuit 17 is updated with a new feedback signal by the next detection of the falling of the secondary voltage detection signal VFB.

The reference voltage Vref is applied to a non-inverted input terminal of the error amplifier 18. The error amplifier 18 outputs, as an error amplification signal VEAO, a signal obtained by amplifying the difference between the feedback signal held by the S/H circuit 17 and the reference voltage Vref to the FB control circuit 19.

A drain current detection signal is inputted to the FB control circuit 19 via the LEB circuit 15, and the error amplification signal VEAO from the error amplifier 18 is also inputted to the FB control circuit 19. Further, the FB control circuit 19 is connected to a feedback phase correction (COMP) terminal. The phase correction capacitor C4 is connected between the negative electrode terminal of the electrolytic capacitor C1 and the feedback phase correction (COMP) terminal. In addition, the FB control circuit 19 compares the drain current detection signal with the phase-corrected error amplification signal VEAO and outputs a turn off signal shown in time chart (d) of FIG. 3 when the drain current detection signal exceeds the error amplification signal VEAO. The turn off signal is inputted to the reset terminal of the Flip-Flop FF1 via the OR circuit OR1 and the switching element Q is turned off, as shown in time chart (c) of FIG. 3. In other words, the FB control circuit 19 serves as a circuit to control the ON width of the switching element Q1 based on the drain current detection signal and the phase-corrected error amplification signal VEAO. The FB control circuit 19 controls the ON width such that the ON width becomes longer as the output voltage Vout is decreased and the error amplification signal VEAO is increased.

Further, the FB control circuit 19 outputs a mode switching signal based on the error amplification signal VEAO and switches an oscillation mode of the oscillation circuit 13. When the error amplification signal VEAO is equal to or greater than an oscillation mode determining threshold, the mode switching signal becomes a Low level and the oscillation circuit 13 is set to the normal oscillation mode. Further, when the error amplification signal VEAO is less than the oscillation mode determining threshold, the mode switching signal becomes a High level and the oscillation circuit 13 is set to the intermittent oscillation mode.

When the falling of the voltage reduction signal Ve transmitted to the primary coil P1 of the transformer T is detected by the pulse detection circuit 4, the trigger circuit 20 outputs a trigger signal to the oscillation circuit 13 and a single-shot clock signal is outputted from the oscillation circuit 13. Meanwhile, the voltage of the primary coil P1 is fallen even when turning on the switching element Q1, and this falling of the voltage is detected by the pulse detection circuit 4, so that a trigger signal is inputted to the trigger circuit 20. Accordingly, the trigger circuit 20 invalidates the trigger signal when turning on the switching element Q1 based on the output of the AND-circuit AND1. In this way, the trigger circuit 20 sorts the voltage reduction signal Ve and the turn on of the switching element Q1.

Figure 4:
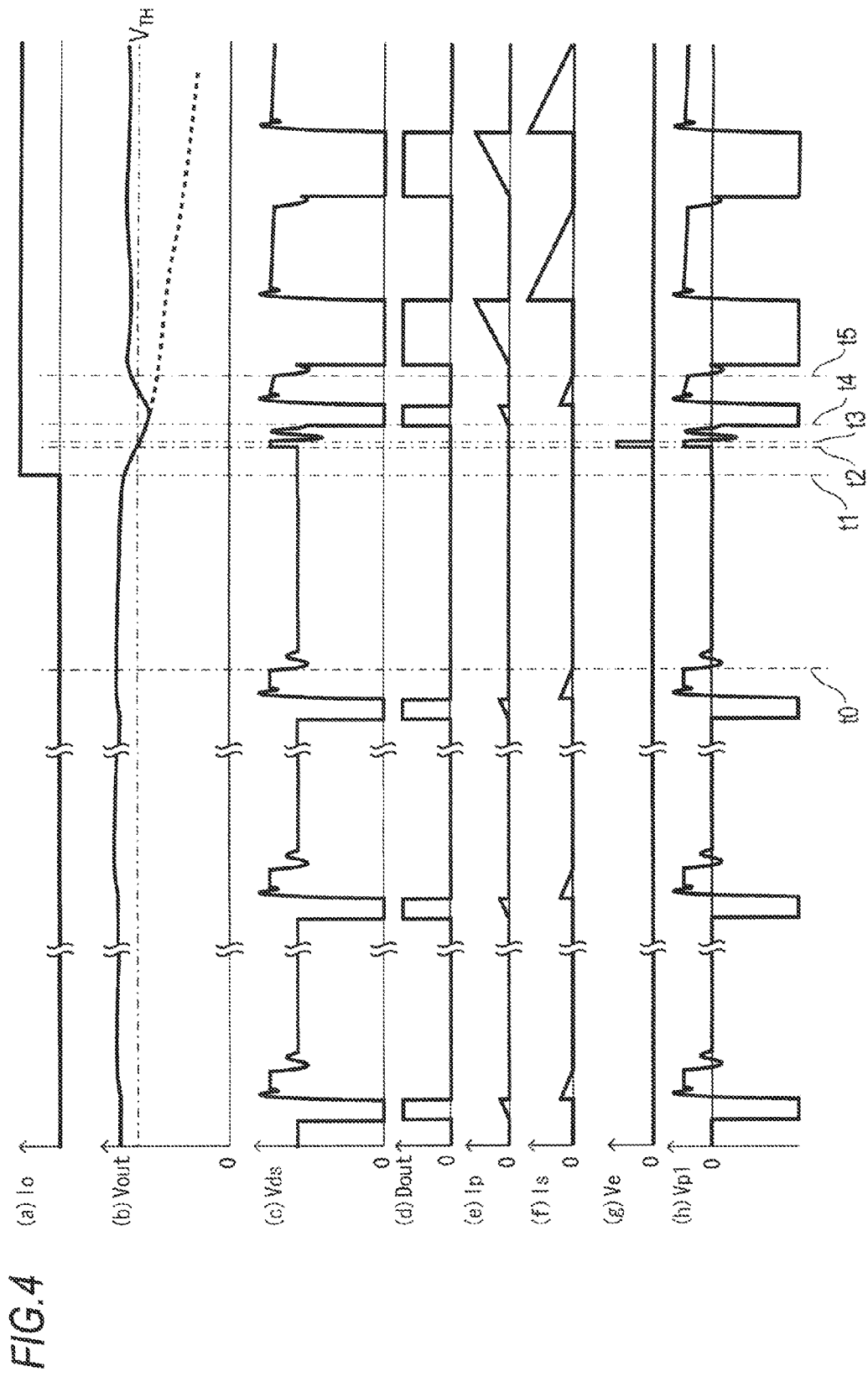
FIG. 4 is a waveform diagram illustrating signal waveforms and an operation waveform of each part in FIG. 1.

FIG. 4 is timing charts illustrating the signals of each part of the control circuit 1 shown in FIG. 1. Time chart (a) of FIG. 4 illustrates an output current Io, time chart (b) of FIG. 4 illustrates the output voltage Vout, time chart (c) of FIG. 4 illustrates a drain-source voltage Vds of the switching element Q1, time chart (d) of FIG. 4 illustrates a DRV signal Dout, time chart (e) of FIG. 4 illustrates a current Ip flowing through the primary coil P1, time chart (f) of FIG. 4 illustrates a current Is flowing through the secondary coil S1, time chart (g) of FIG. 4 illustrates the voltage reduction signal Ve and time chart (h) of FIG. 4 illustrates the voltage Vp1 of the primary coil P1, respectively.

In no load or light load state where the output current Io shown in time chart (a) of FIG. 4 is substantially "zero", the output voltage Vout is equal to or greater than the threshold voltage VTH for voltage reduction detection and is held substantially at a rated voltage, as shown in time chart (b) of FIG. 4. In this case, a dividing voltage ratio of the resistors R1, R2, an amplification factor of the error amplifier 18 and the oscillation mode determining threshold or the like are set so that the error amplification signal VEAO becomes less than the oscillation mode determining threshold. As a result, a High-level mode switching signal is outputted to the oscillation circuit 13 from the FB control circuit 19, and thus the oscillation circuit 13 is set to the intermittent oscillation mode.

At time t1 of the off period of the switching element Q1 during the intermittent oscillation mode, since there is no power-supply from the primary side when load is suddenly changed and the output current Io starts to flow, as shown in time chart (a) of FIG. 4, the output voltage Vout is reduced, as shown in time chart (b) of FIG. 4.

When the output voltage Vout is equal to or less than the preset threshold voltage VTH for voltage reduction detection at time t2, the voltage reduction detection circuit 3 outputs the voltage reduction signal Ve, as shown in time chart (g) of FIG. 4. The voltage reduction signal Ve becomes a voltage based on the coil ratio P1/S1 times of the transformer T, as shown in time chart (h) of FIG. 4, via the secondary coil S1 of the transformer T and is transmitted to the primary coil P1 of the transformer T. The falling (time t3) of the voltage reduction signal Ve transmitted to the primary coil P1 of the transformer T is detected by the pulse detection circuit 4 and inputted to the TRIG terminal of the control circuit 1. When the voltage reduction signal Ve transmitted to the primary coil P1 of the transformer T is fallen, resonance phenomenon due to the inductance of the primary coil P1 and the capacitance of the capacitor C6 occurs, as shown time chart (H) of in FIG. 4 (h). Accordingly, the falling of the voltage reduction signal Ve can be securely detected, as a large voltage variation, by the pulse detection circuit 4.

Next, when the falling of the voltage reduction signal Ve transmitted to the primary coil P1 of the transformer T is detected by the pulse detection circuit 4, the trigger circuit 20 outputs a trigger signal to the oscillation circuit 13. The oscillation circuit 13 to which the trigger signal is inputted from the trigger circuit 20 outputs a single-shot clock signal. Thereby, the switching element Q1 is turned on by the falling of the single-shot clock signal (time t4). At this time point, since the feedback signal detected at time t0 in the last operation is held by the S/H circuit 17, the ON width of the switching element Q1 is controlled on the basis of the feedback signal detected at time t0.

Next, the S/H circuit 17 detects the falling of the secondary voltage detection signal VFB inputted to the FB terminal at time t5 and then holds a new feedback signal. The feedback signal held at time t5 is made such that the output voltage Vout is lowered to the threshold voltage VTH for voltage reduction detection or less by sudden load change. As a result, the error amplification signal VEAO outputted from the error amplifier 18 is made equal to or larger than the oscillation mode determining threshold and the mode switching signal outputted from the FB control circuit 19 is inverted to the Low level. As the mode switching signal is inverted to the Low level, the oscillation circuit 13 is set to the normal oscillation mode and then power s supplied to a secondary side from a primary side according to the load current. Accordingly, as shown in time chart (b) of FIG. 4, the output voltage Vout lowered to the threshold voltage VTH for voltage reduction detection or less is restored. Unlike the present embodiment, in a case of waiting the next turn on of the switching element Q1 in the intermittent oscillation mode without turning on the switching element Q1 by a single-shot clock signal from the trigger circuit 20, power is supplied to a secondary side from a primary side and the output voltage Vout is gradually lowered, as indicated by a dashed line in time chart (b) of FIG. 4. As a result, there is a possibility that the output voltage is lowered below the allowable voltage accuracy.

As described above, the switching power-supply device of the first embodiment includes the voltage reduction detection circuit 3 that outputs a pulse signal, as the voltage reduction signal Ve, to the secondary coil S1 when the reduction of the output voltage Vout is detected, the pulse detection circuit 4 that detects the voltage reduction signal Ve transmitted to the primary coil P1 from the secondary coil S1 and the trigger circuit 20 that outputs a trigger signal to turn on the switching element Q1 when the voltage reduction signal Ve is detected by the pulse detection circuit 4. According to this configuration, since the voltage reduction signal applied to the secondary coil as a voltage signal is transmitted to the primary coil without being greatly attenuated, there are advantages that the voltage reduction signal outputted by the sudden load change can be simply detected as a voltage variation of the primary coil, and thus a rapid response to the sudden load change can be securely made.

Further, according to the first embodiment, the pulse detection circuit 4 is AC-coupled to the connection point between the primary coil S1 and the switching element Q1 (D/ST terminal) with using the capacitor C6. According to this configuration, it is possible to detect the voltage reduction signal Ve without being affected by the polarity of the voltage generated in the primary coil.

Furthermore, according to the first embodiment, the falling of the voltage reduction signal Ve is detected. According to this configuration, since the falling of the voltage reduction signal Ve as a large voltage variation can be detected by the resonance phenomenon due to the inductance of the primary coil P1 and the capacitance of the capacitor C6, the voltage reduction signal outputted by the sudden load change can be detected more securely.

Second Embodiment

Figure 5:
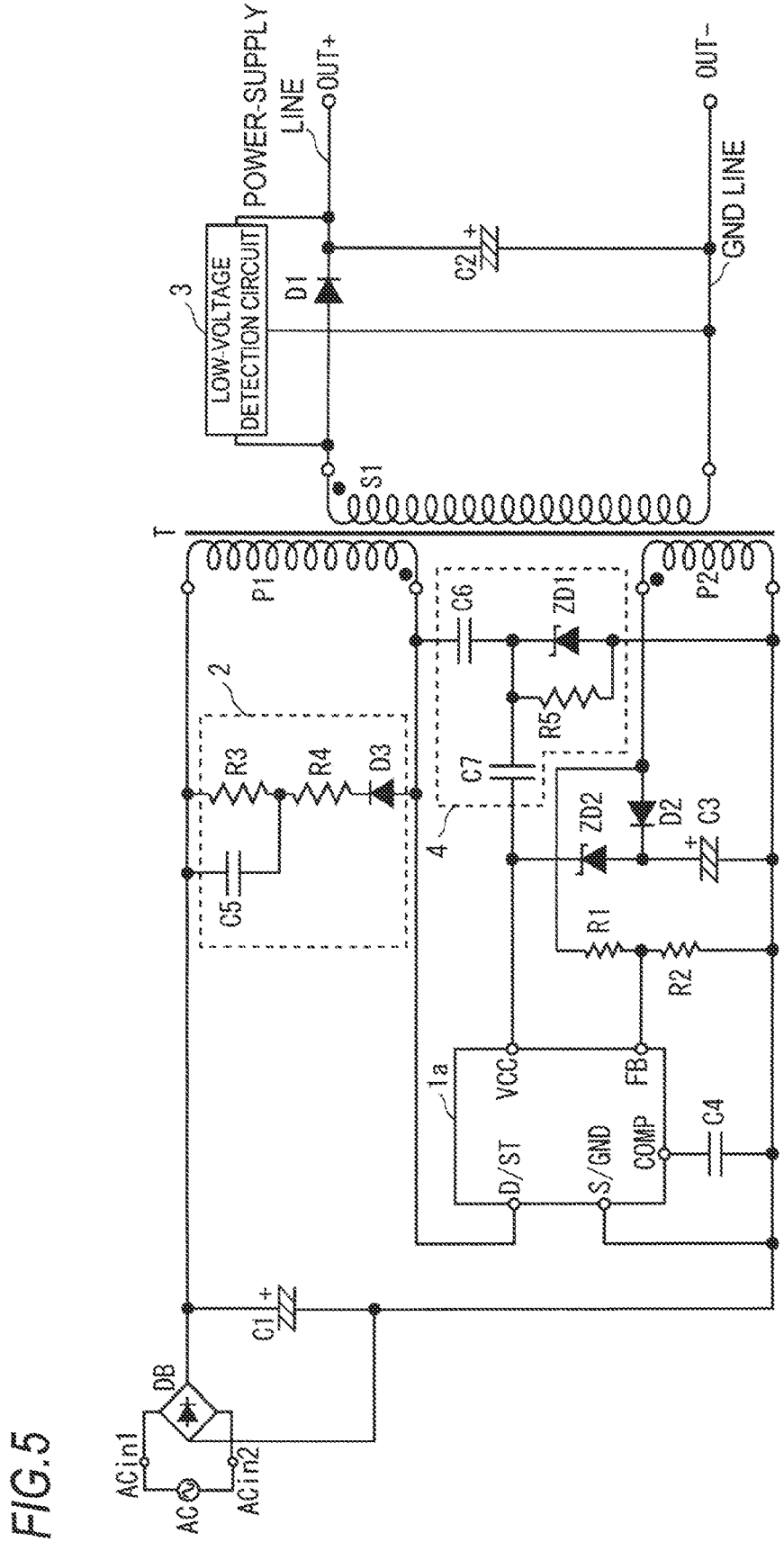
FIG. 5 is a circuit configuration diagram illustrating a circuit configuration of a switching power-supply device according to a second embodiment of this disclosure.
Figure 6:
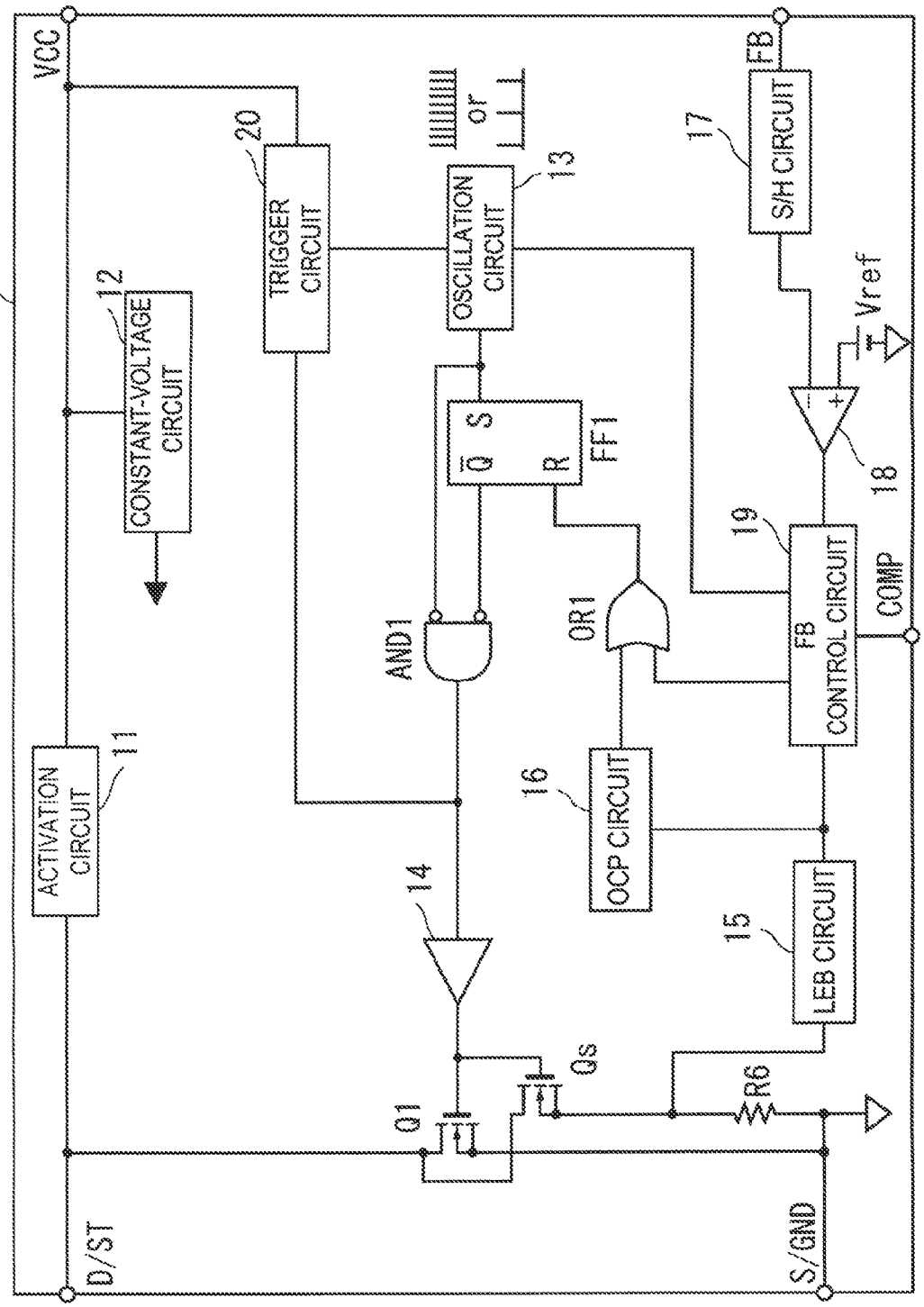
FIG. 6 is a circuit configuration diagram illustrating a circuit configuration diagram of a control circuit shown in FIG. 5.

As shown in FIG. 5 and FIG. 6, a switching power-supply device of a second embodiment uses a control circuit 1a having no TRIG terminal, and the falling of the voltage reduction signal Ve detected by the pulse detection circuit 4 is inputted to the VCC terminal of the control circuit 1a and then inputted to the trigger circuit 20 from the VCC terminal. In addition, the switching power-supply device includes a zener diode ZD2 and a connection point between the rectifier diode D2 and the electrolytic capacitor C3 is connected to an anode of the zener diode ZD2. Further, a cathode of the zener diode ZD2 is connected to the VCC terminal of the control circuit 1a. On the inside of the control circuit 1a, the VCC terminal is connected to the trigger circuit 20. As a result, the voltage reduction signal Ve corresponding to a zener voltage of the zener diode ZD2 is inputted to the trigger circuit 20.

As described above, according to the second embodiment, the oscillation circuit 13, the FB control circuit 19 and the trigger circuit 20 are incorporated into the control circuit 1a to control a switching operation of the switching element Q1, the voltage reduction signal Ve detected by the pulse detection circuit 4 is inputted to the trigger circuit 20 via the VCC terminal. According to this configuration, in addition to the effects of the first embodiment, there is no need that the control circuit 1a includes a new TRIG terminal to which the voltage reduction signal Ve transmitted from the secondary side is inputted. Accordingly, in a case of manufacturing the control circuit 1a as an IC, it is possible to reduce the number of terminals, thereby reducing the cost.

Third Embodiment

Figure 7:
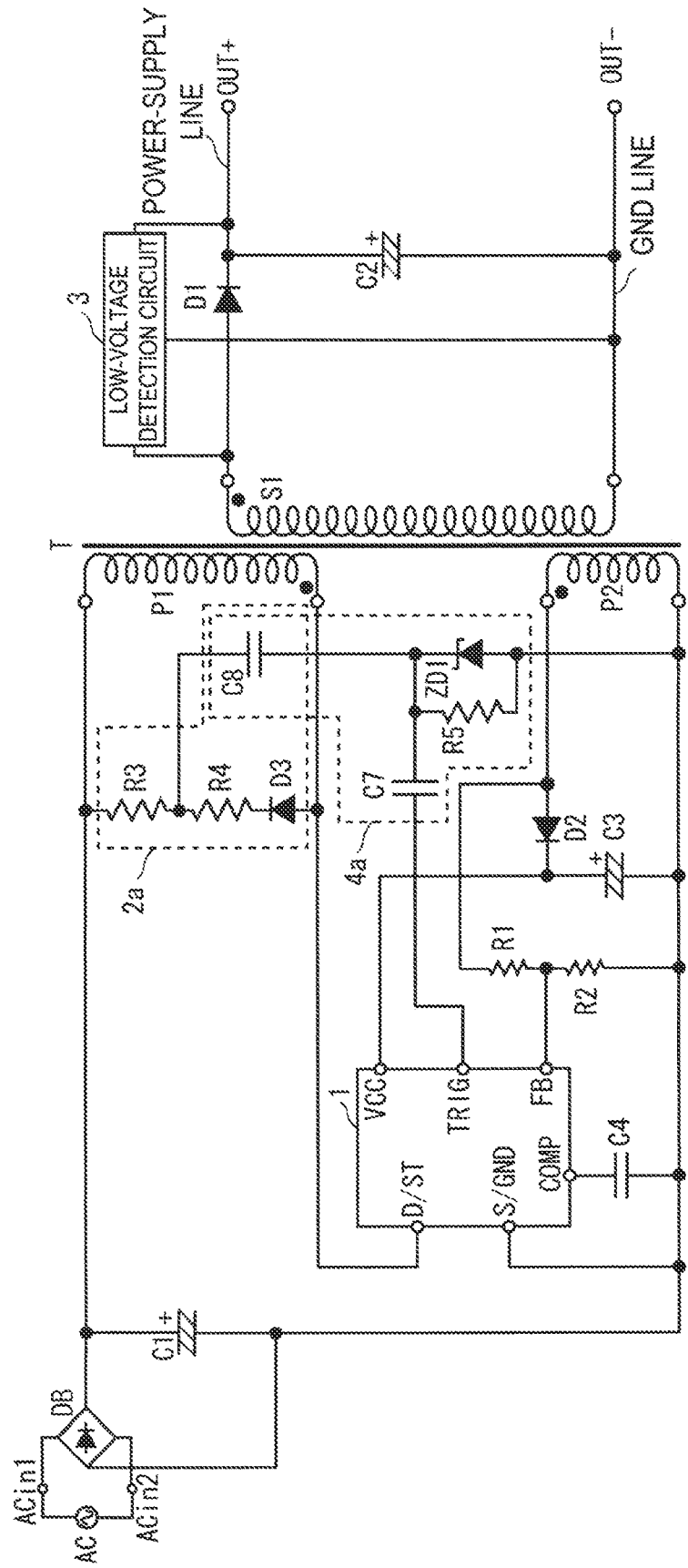
FIG. 7 is a circuit configuration diagram illustrating a circuit configuration of a switching power-supply device according to a third embodiment of this disclosure.

As shown in FIG. 7, a switching power-supply device of a third embodiment uses the function of the capacitor C5 of the snubber circuit 2 and the function of the capacitor C6 of the pulse detection circuit 4 in the first embodiment in order to realize the such effect by a single capacitor C8. A connection point between the resistor R3 and the resistor R4 and a connection point between the cathode of the zener diode ZD1 and the capacitor C7 are connected to each other via the capacitor C8. According to this configuration, the capacitor C8 serves as the capacitor C5 of the snubber circuit 2 in the first embodiment and a snubber circuit 2a is configured by the resistors R3, R4, the diode D3 and the capacitor C8. Further, the capacitor C8 serves as the capacitor C6 of the pulse detection circuit 4 in the first embodiment and a pulse detection circuit 4a is configured by the resistor R5, the capacitors C7, C8 and the zener diode ZD1.

As described above, according to the third embodiment, the snubber circuit 2a is connected between the primary coil S1 and a connection point between the primary coil S1, and the switching element Q1 (D/ST terminal) is AC-coupled to the pulse detection circuit 4 by using the capacitor C8 of the snubber circuit 2a. According to this configuration, in addition to the effects of the first embodiment, it is possible to realize reduction in the number of parts and the cost. Specifically, the capacitor C5 of the snubber circuit 2 and the capacitor C7 of the pulse detection circuit 4 in the first embodiment are required to have a relatively large capacitance and thus the cost is increased. Accordingly, it is possible to obtain a large effect described above by realizing the functions of the capacitor C5 and the capacitor C7 by a single capacitor C8.

Fourth Embodiment

Figure 8:
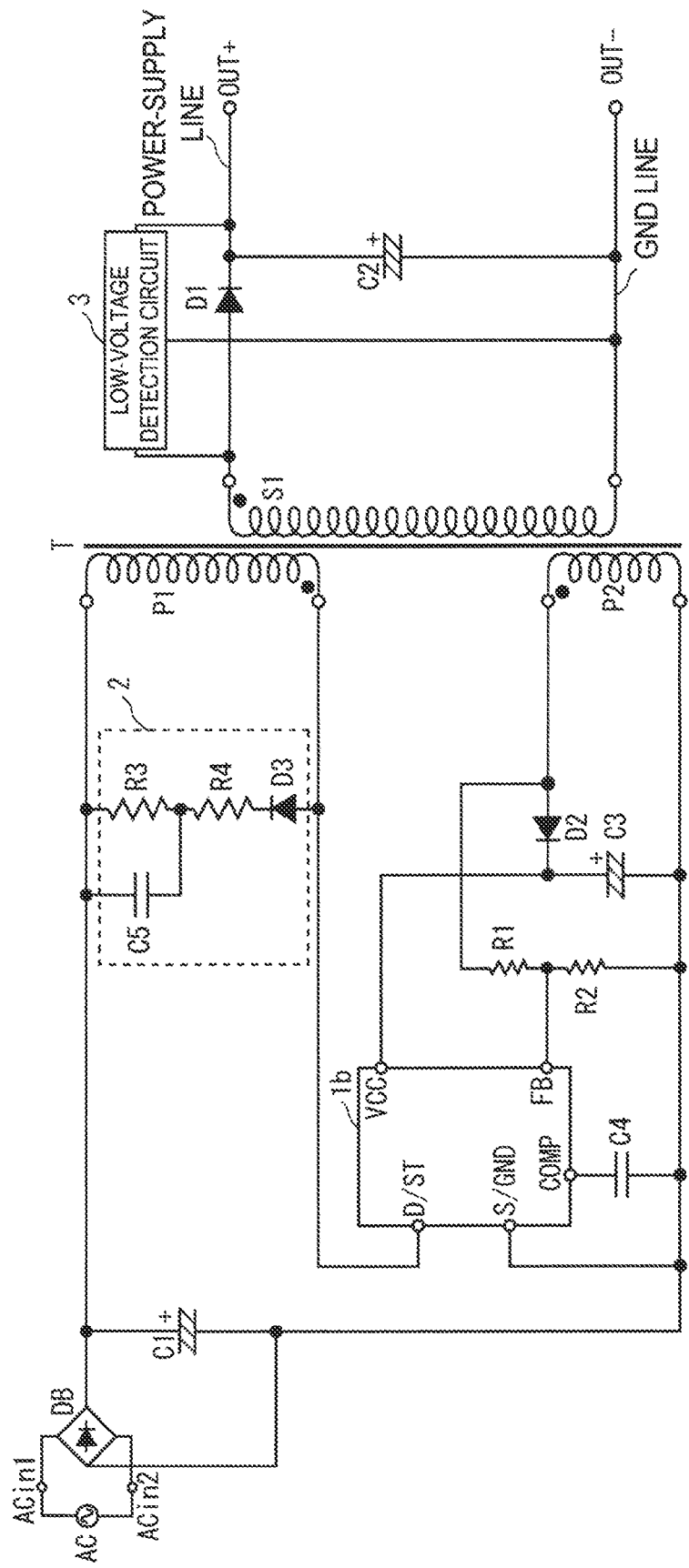
FIG. 8 is a circuit configuration diagram illustrating a circuit configuration of a switching power-supply device according to a fourth embodiment of this disclosure.
Figure 9:
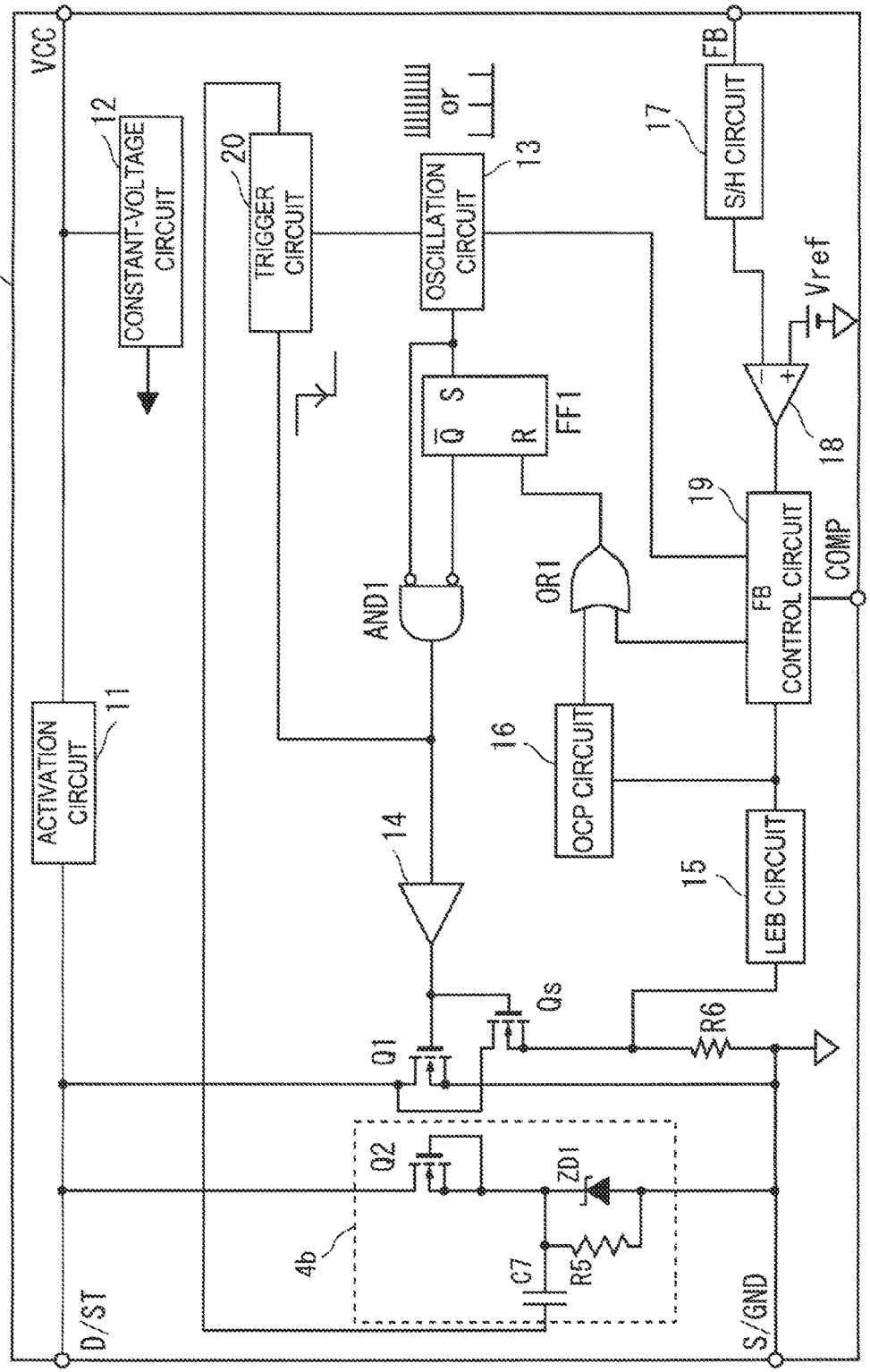
FIG. 9 is a circuit configuration diagram illustrating a circuit configuration diagram of a control circuit shown in FIG. 8.

As shown in FIG. 8 and FIG. 9, a switching power-supply device of a fourth embodiment is configured such that the pulse detection circuit 4 in the first embodiment is incorporated, as a pulse detection circuit 4b, into a control circuit 1b.

The pulse detection circuit 4b includes the resistor R5, the capacitor C7, the zener diode ZD1 and a switch element Q2. FET or the like is used as the switch element Q2, and the function of the capacitor C6 of the pulse detection circuit 4 in the first embodiment is realized by the stray capacitance between the drain and gate of the FET and the stray capacitance between the drain and source thereof. The switch element Q2 where the gate and source are short-circuited, and the zener diode ZD1 are connected between the D/ST terminal and the S/GND terminal. Further, the resistor R5 is connected in parallel with the zener diode ZD1, and a connection point between the source of the switch element Q2 and the cathode of the zener diode ZD1 is connected to the trigger circuit 20 via the capacitor C7.

As described above, according to the fourth embodiment, the switching element Q1, the oscillation circuit 13, the feedback control circuit 19, the pulse detection circuit 4b and the trigger circuit 20 are incorporated into the control circuit 1b to control a switching operation of the switching element Q1, and the pulse detection circuit 4b is AC-coupled to the D/ST terminal for connecting the primary coil S1 and the switching element Q1. According to this configuration, in addition to the effects of the first embodiment, there is no need that the control circuit 1b includes a new TRIG terminal to which the voltage reduction signal Ve transmitted from the secondary side is inputted. Accordingly, in a case of manufacturing the control circuit 1b as an IC, it is possible to reduce the number of terminals, thereby reducing the cost. Furthermore, since the pulse detection circuit 4b is incorporated into the control circuit 1b, this disclosure can be realized just by attaching the control circuit 1b made as the IC to a conventional primary-side circuit.

Although this disclosure has been described with reference to the specific embodiments in the foregoing description, it goes without saying that the specific embodiments are just illustrative and can be changed and made without departing from the spirit of this disclosure.

What is claimed is:
1. A switching power-supply device comprising:
   a transformer including a primary coil, a secondary coil and an auxiliary coil;
   a switching element connected in series with the primary coil,
   an oscillation circuit configured to output a signal to turn on the switching element;
   an output voltage generation circuit configured to generate an output voltage from a voltage generated in the secondary coil;
   a control circuit power-supply-voltage generation circuit configured to generate a power-supply voltage for a control circuit from a voltage generated in the auxiliary coil;
   a feedback control circuit configured to control an ON width of the switching element by using, as a feedback signal, the voltage generated in the auxiliary coil according to an on-and-off operation of the switching element;

a voltage reduction detection circuit configured to output a pulse signal as a voltage reduction signal to the secondary coil when a reduction of the output voltage is detected;

a voltage-reduction-signal detection circuit configured to detect the voltage reduction signal transmitted to the primary coil from the secondary coil, the voltage-reduction-signal detection circuit comprising a first capacitor AC-coupled to a connection point between the primary coil and the switching element; and a trigger circuit configured to output a trigger signal to turn on the switching element when the voltage reduction signal is detected by the voltage-reduction-signal detection circuit.

2. The switching power-supply device according to claim 1, wherein the voltage-reduction-signal detection circuit is coupled to flail the connection point between the primary coil and the switching element via the first capacitor.

3. The switching power-supply device according to claim 1, wherein the oscillation circuit, the feedback control circuit and the trigger circuit are incorporated into the control circuit controlling a switching operation of the switching element, and wherein the voltage reduction signal detected by the voltage-reduction-signal detection circuit is inputted to the trigger circuit via an input power-supply terminal of the control circuit.

4. The switching power-supply device according to claim 1, further comprising a snubber circuit comprising a diode, a resistor, and a second capacitor, wherein the snubber circuit is connected between the primary coil, wherein a connection point between the primary coil and the switching element and the voltage-reduction-signal detection circuit are AC-coupled with the second capacitor of the snubber circuit.

5. The switching power-supply device according to claim 1, wherein the switching element, the oscillation circuit, the feedback control circuit, the voltage-reduction-signal detection circuit and the trigger circuit are incorporated into the control circuit controlling a switching operation of the switching element, and wherein the first capacitor is coupled to a connection point between the primary coil and a drain of the switching element and the voltage-reduction-signal detection circuit, and wherein the voltage-reduction-signal detection circuit is coupled to the connection point via the first capacitor.

6. The switching power-supply device according to claim 1, wherein the first capacitor coupled to the connection point between the primary coil and the switching element is comprised of a first stray capacitance between a drain and a gate of the switching element and a second stray capacitance between the drain and a source of the switching element.

* * * * *